US012003032B2

(12) United States Patent
Sun et al.

(10) Patent No.: US 12,003,032 B2
(45) Date of Patent: Jun. 4, 2024

(54) HYBRID NETWORK ANTENNA

(71) Applicants: PROSE TECHNOLOGIES (SUZHOU) CO., LTD., Suzhou (CN); PROSE TECHNOLOGIES LLC, Mount Olive, NJ (US)

(72) Inventors: He Sun, Suzhou (CN); Shengguang Wang, Suzhou (CN); Zhongcao Yang, Suzhou (CN); Haixia Zhang, Suzhou (CN); Linfeng Sheng, Suzhou (CN)

(73) Assignees: PROSE TECHNOLOGIES (SUZHOU) CO., LTD., Suzhou (CN); PROSE TECHNOLOGIES LLC, Mount Olive, NJ (US)

( * ) Notice: Subject to any disclaimer, the term of this patent is extended or adjusted under 35 U.S.C. 154(b) by 231 days.

(21) Appl. No.: 17/564,671

(22) Filed: Dec. 29, 2021

(65) Prior Publication Data

US 2022/0123482 A1 Apr. 21, 2022

Related U.S. Application Data

(63) Continuation of application No. PCT/CN2020/103841, filed on Jul. 23, 2020.

(51) Int. Cl.
*H01Q 21/24* (2006.01)
*H01Q 9/04* (2006.01)
*H01Q 21/06* (2006.01)

(52) U.S. Cl.
CPC ........... *H01Q 21/24* (2013.01); *H01Q 9/0414* (2013.01); *H01Q 21/065* (2013.01)

(58) Field of Classification Search
CPC ........ H01Q 1/246; H01Q 19/10; H01Q 21/00; H01Q 21/06; H01Q 21/24
See application file for complete search history.

(56) References Cited

U.S. PATENT DOCUMENTS

| | | | | |
|---|---|---|---|---|
| 9,711,865 | B2 | 7/2017 | Liu | |
| 10,164,343 | B2 * | 12/2018 | Jan | H01Q 3/24 |
| 11,019,506 | B2 * | 5/2021 | Wu | H01Q 1/246 |
| 11,043,755 | B2 * | 6/2021 | Farzaneh | H01Q 21/26 |

(Continued)

FOREIGN PATENT DOCUMENTS

| | | | |
|---|---|---|---|
| CN | 1599138 | A | 3/2005 |
| CN | 102084546 | A | 6/2011 |

(Continued)

*Primary Examiner* — Hasan Islam
(74) *Attorney, Agent, or Firm* — ANOVA LAW GROUP, PLLC

(57) ABSTRACT

A hybrid network antenna includes a reflection plate, a low frequency antenna array, and a dual-beam antenna array. The reflection plate includes a flat member and bending members formed by bending the two ends of the flat member. The low frequency antenna array is arranged on the flat member. The dual-beam antenna array include beam antenna sub-arrays located on both sides of the low frequency antenna array. The beam antenna sub-array on each side of the low frequency array includes a plurality of first high frequency radiating element arrays disposed in intervals along the width direction of the reflection plate. The plurality of high frequency radiating element arrays of each beam antenna sub-array are arranged on the reflection plate in different planes or a common plane.

18 Claims, 4 Drawing Sheets

(56) References Cited

U.S. PATENT DOCUMENTS

| | | | |
|---|---|---|---|
| 2009/0312057 | A1 | 12/2009 | Moon et al. |
| 2010/0109965 | A1 | 5/2010 | Foo et al. |
| 2019/0103660 | A1 | 4/2019 | Zimmerman et al. |

FOREIGN PATENT DOCUMENTS

| | | | |
|---|---|---|---|
| CN | 103715519 | A | 4/2014 |
| CN | 206602185 | U | 10/2017 |
| CN | 108011190 | A | 5/2018 |
| CN | 208539093 | U | 2/2019 |
| CN | 109509995 | A | 3/2019 |
| CN | 210111046 | U | 2/2020 |
| CN | 112151943 | A | 12/2020 |
| EP | 3758142 | A1 | 12/2020 |
| WO | 2009052218 | A1 | 4/2009 |

* cited by examiner

HYBRID NETWORK ANTENNA

CROSS-REFERENCE TO RELATED APPLICATION

This application is a continuation application of PCT application PCT/CN2020/103841, filed on Jul. 23, 2020, the entire content of which is incorporated herein by reference.

FIELD OF THE DISCLOSURE

The present disclosure relates to the technical field of antenna, in particular, to a hybrid network antenna.

BACKGROUND

In a wireless communication system, antenna is an interface between the transceiver and the external propagation medium. When a signal is transmitted, the antenna converts a high frequency current into an electromagnetic wave. When the signal is received, the antenna converts an electromagnetic wave into a high frequency current. As mobile communication technologies continue to develop rapidly, mobile communication networks are also continuously upgraded, and as a key device for mobile communication networks, the base station antenna's performance and practical functions are also continuously enhanced and improved.

For different areas and/or different user groups, the types of base station antennas applied are not the same. During the construction of the traditional base station, a plurality of separate antennas are arranged, wherein each antenna operates in a corresponding frequency band to meet the needs of different regions and/or different user groups. However, the arrangement of a plurality of separate antennas, on the one hand, is not conducive to antenna integration and miniaturization, and on the other hand, is also not conducive to alleviation of the contradiction between the antenna site resources, which also increases the cost of the base station.

SUMMARY

To overcome the deficiencies of the prior art, the object of the present disclosure includes at least providing a hybrid network antenna to perform a flexible combination of a plurality of types of antenna arrays to meet the needs of different regions and/or different customers.

One aspect of the present disclosure provides a hybrid network antenna including: a reflection plate including a flat member and bending members arranged at both ends of the flat member; a low frequency antenna array arranged on the flat member; and at least one dual-beam antenna array including beam antenna sub-arrays disposed on both sides of the low frequency antenna array. Each bending member is formed by bending an end of the flat member. The reflection plate has a width direction and a length direction perpendicular to the width direction. The beam antenna sub-array on each side of the low frequency array includes a plurality of first high frequency radiating element arrays disposed in intervals along the width direction of the reflection plate. In each beam antenna sub-array, the plurality of first high frequency radiating element arrays include at least one first high frequency radiating element array arranged on the flat member and one or more first high frequency radiating element arrays arranged on the bending member corresponding to a side of the low frequency antenna array that the beam antenna sub-array is disposed on.

Another aspect of the present disclosure provides a hybrid network antenna including: a reflection plate including a flat member and bending members arranged at both ends of the flat member; a low frequency antenna array arranged on the flat member; and at least one dual-beam antenna array including beam antenna sub-arrays disposed on both sides of the low frequency antenna array. Each bending member is formed by bending an end of the flat member. The reflection plate has a width direction and a length direction perpendicular to the width direction. The beam antenna sub-array on each side of the low frequency array includes a plurality of first high frequency radiating element arrays disposed in intervals along the width direction of the reflection plate. In each beam antenna sub-array, the plurality of first high frequency radiating element arrays are all arranged on the bending member corresponding to a side of the low frequency antenna array that the beam antenna sub-array is disposed on.

In some embodiments, the at least one dual-beam antenna array includes a plurality of the dual-beam antenna arrays disposed in intervals on the reflection plate along the length direction of the reflection plate.

In some embodiments, a cross section of the reflection plate is in a trapezoid shape.

In some embodiments, the low frequency antenna array includes a plurality of low frequency radiating elements are arranged on the flat member in an S-shape along the length direction of the reflection plate.

In some embodiments, the plurality of the low frequency radiating elements are arranged in an S-shape.

In some embodiments, the adjacent two first high frequency radiating element arrays are interleaved.

In some embodiments, each of the first high frequency radiating element arrays includes a plurality of first high frequency radiating elements disposed in intervals along the length direction of the reflection plate, and the plurality of the first high frequency radiating elements are arranged in a linear arrangement.

In some embodiments, the hybrid network antenna further comprises a high frequency antenna array arranged on the flat member; the beam antenna sub-arrays are located on both sides of the low frequency antenna array and the high frequency antenna array.

In some embodiments, the high frequency antenna array includes a second high frequency radiating element array. The second high frequency radiating element array is interleaved with one of the first high frequency radiating element arrays that is adjacent to the second high frequency radiating element array.

In some embodiments, the second high frequency radiating element array includes a plurality of second high frequency radiating elements arranged along the length direction of the reflection plate, and the plurality of the second high frequency radiating elements are arranged in a linear arrangement.

The beneficial effects of the present disclosure are:

(1) The hybrid network antenna of the present disclosure flexibly nests a low frequency antenna array, a high frequency antenna array, and a dual-beam antenna array on a trapezoidal reflection plate, and a plurality of antenna arrays can operate in different bands. Such configuration can, on one hand, satisfy the needs of different regions and/or different customers; and on the other hand, reduce the total number of antennas, reduce the construction cost of the base station, and alleviate the contradiction between the antenna sites.

(2) An exemplary hybrid network antenna of the present disclosure arranges a plurality of first high frequency radiating element arrays of the beam antenna sub-array on the reflection plate in different planes, which can provide a sufficient space for the high frequency antenna array and the low frequency antenna array, thereby improving the stability of the antenna structure.

(3) An exemplary hybrid network antenna of the present disclosure arranges two beam antenna sub-arrays of the dual-beam antenna on both sides of the low frequency antenna array and the high frequency antenna array respectively, so that the two beam antenna sub-arrays are far apart from each other, which can provide high beam pointing stability and high polarization isolation characteristics and reduce interference between the co-polarized beams.

Figure 1:
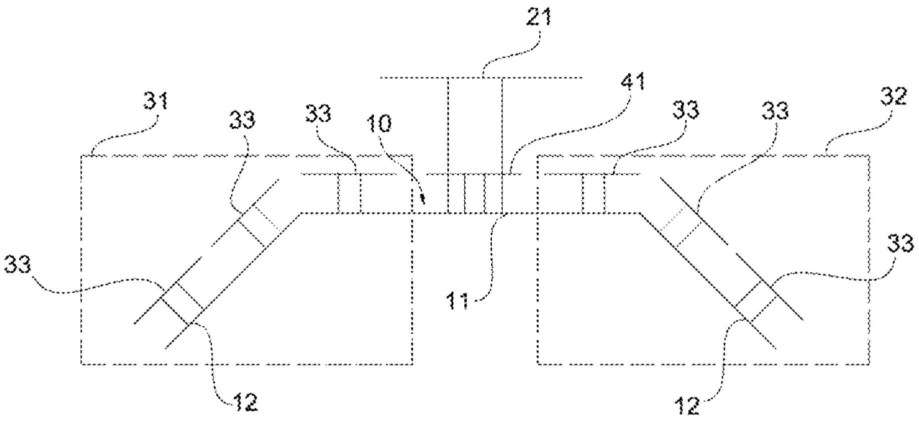
FIG. 1 is a side view of a hybrid network antenna according to one embodiment of the present disclosure.

Reference numerals: 10. reflection plate, 11. flat member, 12. bending member, 20. low frequency antenna array, 21. low frequency radiating element, 30. dual-beam antenna array, 31. first beam antenna sub-array, 32. second beam antenna sub-array, 33. first high frequency radiating element, 40. high frequency antenna array, 41. second high frequency radiating element.

DETAILED DESCRIPTION

The technical solution of the embodiments of the present disclosure will be described in connection with the drawings of the present disclosure below.

Example hybrid network antennas of the present disclosure are described in accordance with FIG. 1 to FIG. 4, and embodiments of the antenna arrays can be combined flexibly to meet the needs of different regions and/or different customers.

Figure 2:
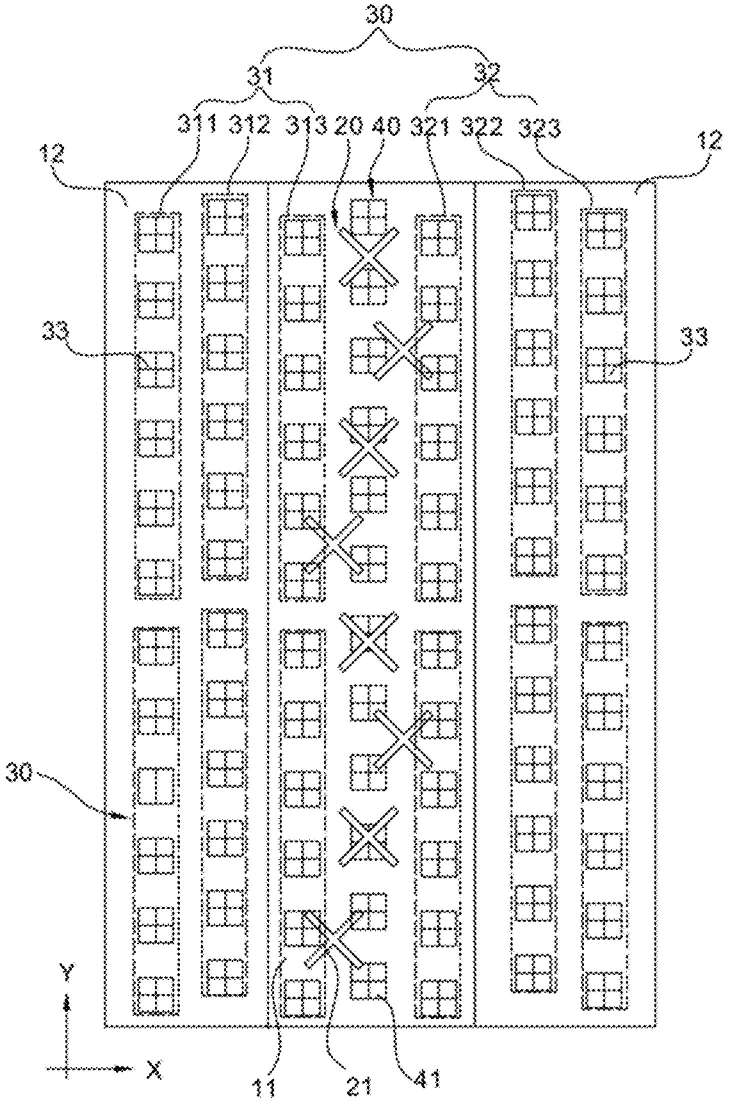
FIG. 2 is a top plan view of the hybrid network antenna shown in FIG. 1.

As shown in FIGS. 1 and 2, an exemplary hybrid network antenna disclosed according to one embodiment includes a reflection plate 10, a low frequency antenna array 20 and at least one dual-beam antenna array 30, the low frequency antenna array 20 and the dual-beam antenna array 30 are arranged on the reflection plate 10, wherein the operating frequency range of the low frequency antenna array 20 is 698~960 MHz and the operating frequency range of the dual-beam antenna array 30 is 1695~2690 MHz.

Specifically, the reflection plate 10 having a width direction and a length direction perpendicular to the width direction includes a flat member 11 and the bending members 12 provided at both ends of the flat member 12, wherein the bending member 12 is formed by bending the corresponding end of the flat member 11. In one embodiment, both ends of the flat member 11 in the width direction are bent toward two sides thereof respectively to form two bending member 12, so that the cross section of the reflection plate 10 is in a trapezoid shape, and the flat member 11 and two bending members 12 form three planes of the trapezoid shape.

The low frequency antenna array 20 includes a plurality of low frequency radiating elements 21disposed in intervals along the second direction Y, wherein the plurality of low frequency radiating elements 21 are arranged on the flat member 11 of the reflection plate 10. In one embodiment, the second direction Y is the length direction of the reflection plate 10. In one embodiment, the low frequency antenna array 20 is a low frequency 65° antenna array. In one embodiment, a plurality of low frequency radiating element 21 of the low frequency antenna array 20 are arranged on the flat member 11 of the reflection plate 10 at equal intervals and in an S-shape to function well in the signal isolation. In another embodiment, a plurality of low frequency radiating element 21 may be arranged in a linear arrangement.

In one embodiment, each dual-beam antenna array 30 includes two beam antenna sub-arrays, respectively described as a first beam antenna sub-array 31 and a second beam antenna sub-array 32, wherein the first beam antenna sub-array 31 and the second beam antenna sub-array 32 are located on the reflection plate 10 at both sides of the low frequency antenna array 20 respectively, and wherein the first beam antenna sub-array 31 and a corresponding feeding network (not shown) form a beam antenna, and the second antenna sub-array 32 and a corresponding feeding network (not shown) form another beam antenna, and the two beam antennas eventually form a dual-beam antenna. Each beam antenna sub-array includes a plurality of first high frequency radiating element arrays disposed in intervals along the first direction X, wherein two adjacent first high frequency radiating element arrays are interleaved, namely the ends of two adjacent first high frequency radiating elements are not aligned, which can reduce the interference between signals. Each first high frequency radiating element array includes a plurality of first high frequency radiating elements 33 disposed in intervals along a length direction, wherein the plurality of first high frequency radiating elements 33 are arranged in a linear arrangement. As used herein, the first direction X is a width direction of the reflection plate 10.

In some embodiments, in conjunction with FIGS. 1 and 2, a plurality of first high frequency radiating element arrays of each beam antenna sub-array are arranged on the reflection plate 10 in different planes(e.g., a plane of the bending member 12 and a plane of the flat member 11):

Accordingly, when the multiple first high frequency radiating element arrays are arranged on the reflection plate 10 in different planes, at least one first high frequency radiating element array is arranged on the flat member 11 of the reflection plate 10 and the rest of the first high frequency radiating element arrays are arranged on the bending member 12 corresponding to the side (the left side or the right side as shown in FIG. 1) of the beam antenna sub-array 31/32 respectively. In other words, in the beam antenna sub-array 31 or 32, the multiple first high frequency radiating element arrays include at least one first high frequency radiating element array arranged on the flat member 11 and one or more first high frequency radiating element arrays arranged on the bending member 12 corresponding to a side of the low frequency antenna array 20 that the beam antenna sub-array 31 or 32 is disposed on The first high frequency radiating element array on the flat member 11 is in a plane different from the first high frequency radiating element arrays on the bending member 12, and is in the same plane as the low frequency antenna array 20. Hereinafter is a detailed description made by taking both a first beam antenna sub-array 31 and a second beam antenna sub-array 32 including three first frequency radiating element arrays as an example. The three first high frequency radiating element arrays of the first beam antenna sub-array 31 are a first high frequency radiating element array 311, a first high frequency radiating element array 312, and a first high frequency radiating element array 313; and the three first high frequency radiating element arrays of the second beam antenna sub-array 32 are a first high frequency radiating element array 321, a first high frequency radiating element array 322, and a first high frequency radiating element array 323. It can be seen in FIG. 2 that in a first beam antenna sub-array 31, the first high frequency radiating element array 311 and the first high frequency radiating element array 312 are in the same plane, i.e., on the bending member 12 of the reflection plate 10, while the first high frequency radiating element array 313 and the low frequency antenna array 20 are in the same plane, i.e., on the flat member of the reflection plate 10, but the first high frequency radiating element array 313 is in the plane different from the other two first high frequency radiating element arrays. Likewise, in a first beam antenna sub-array 32, the first high frequency radiating element array 322 and the first high frequency radiating element array 323 are in the same plane, i.e., on the bending member 12 of the reflection plate 10, while the first high frequency radiating element array 321 and the low frequency antenna array 20 are in the same plane, i.e., on the flat member of the reflection plate 10, but the first high frequency radiating element array 321 is in the plane different from the other two first high frequency radiating element arrays.

In conjunction with FIGS. 1 and 2, the hybrid network further includes a high frequency antenna array 40 disposed on the flat member 11 of the reflection plate 10, two beam antenna sub-arrays 31 are located on the both sides of the low frequency antenna array 20 and the high frequency antenna array 40, and the high frequency antenna array 40 includes a second high frequency radiating element array, wherein the second high frequency radiating element array is interleaved with one of the first high frequency radiating element arrays that is adjacent to the second high frequency radiating element array to reduce the interference. The second high frequency radiating element array includes a plurality of second high frequency radiating elements 41 disposed in intervals along the second direction Y, and the plurality of second high frequency radiating elements 41 are arranged on the flat member 11 of the reflection plate 10. In some embodiments, the high frequency radiating element 40 is a high frequency 65° antenna array. In some embodiments, in the high frequency radiating element 40, the plurality of second high frequency radiating elements 41 are arranged on the flat member 11 of the reflection plate 10 at equal intervals and in a linear arrangement.

In one embodiment, one or two dual-beam antenna arrays are arranged on the reflection plate 10. In another embodiment, the number of dual-beam antenna arrays may be arranged according to actual demand. When one dual-beam antenna array is arranged on the reflection plate 10, the dual-beam antenna array 30, the low frequency antenna array 20, and the high frequency antenna array 40 form a hybrid network antenna including one low frequency antenna, two high frequency antennas and a dual-beam antenna; when two dual-beam antenna arrays are arranged on the reflection plate 10, the two dual-beam antenna arrays are disposed in intervals along the second direction Y. As shown in FIG. 2, the two dual-beam antenna arrays 30 and the low frequency antenna 20 form a hybrid network antenna including one low frequency antenna and two dual-beam antennas, or the two dual-beam antenna arrays 30, the low frequency antenna array 20, and the high frequency antenna array 40 form a hybrid network antenna including one low frequency antenna, two high frequency antennas and two dual-beam antennas. Upon implementation, the low frequency antenna, the high frequency antenna and the dual-beam antenna arrays can be freely combined in accordance with the actual demand to meet the needs of different regions and/or user requirements.

Figure 3:
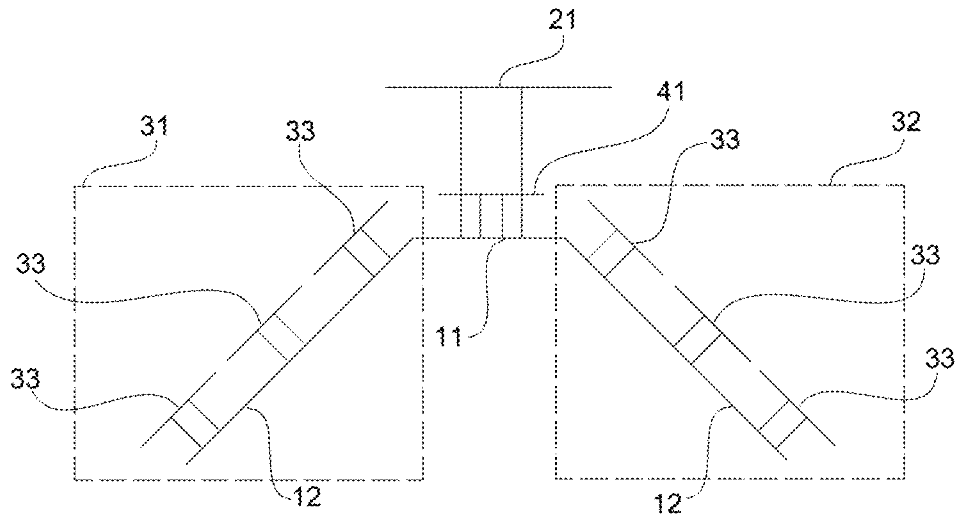
FIG. 3 is a side view of a hybrid network antenna according to another embodiment of the present disclosure.
Figure 4:
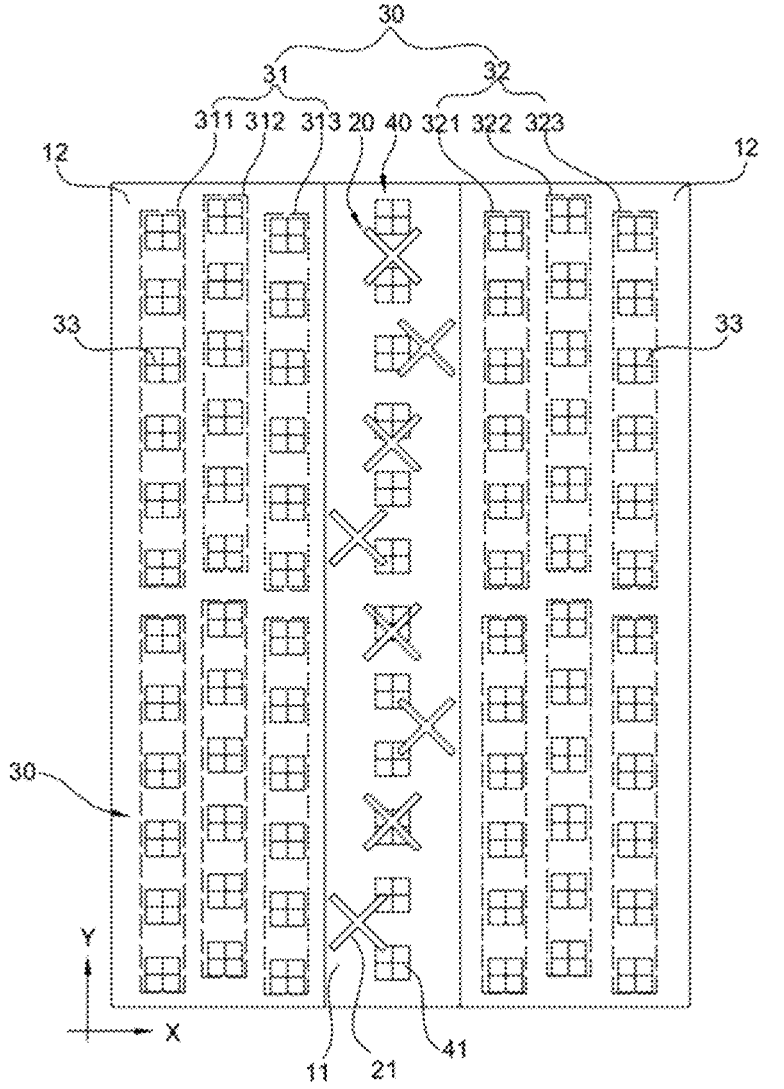
FIG. 4 is a top plan view of the hybrid network antenna shown in FIG. 3.

In conjunction with FIGS. 3 and 4, another exemplary hybrid network antenna disclosed herein includes the reflection plate 10, the low frequency antenna array 20, and at least one dual-beam antenna array 30. The low frequency antenna array 20 and the at least one dual-beam antenna array 30 are arranged on the reflection plate 10, wherein the operating frequency range of the low frequency antenna array 20 is 698~960 MHz, and the operating frequency range of the dual-beam antenna array 30 is 1695~2690 MHz.

The structures of the reflection plate 10 and the low frequency antenna array in the embodiments in accordance with FIGS. 3-4 are same or similar as these in the embodiments in accordance with FIGS. 1-2, and the detailed structures are described by reference to the previous embodiments and thus will not be described herein.

In some embodiments, each dual-beam antenna array 30 includes two beam antenna sub-arrays which are respectively described as a first beam antenna sub-array 31 and a second beam antenna sub-array 32, wherein the first beam antenna sub-array 31 and the second beam antenna sub-array 32 are located on the reflection plate 10 at both sides of the low frequency antenna array 20 respectively, and wherein the first beam antenna sub-array 31 and a corresponding feeding network (not shown) form a beam antenna, while the second antenna sub-array 32 and a corresponding feeding network (not shown) form another beam antenna, the two beam antennas eventually form a dual-beam antenna. Each beam antenna sub-array includes a plurality of first high frequency radiating element arrays disposed in intervals along the first direction, wherein two adjacent first high frequency radiating element arrays are interleaved. Each first high frequency radiating element array includes a plurality of first high frequency radiating elements 33 disposed in intervals along a length direction, and the plurality of first high frequency radiating elements 33 are arranged in a linear arrangement.

In some embodiments, in conjunction with FIGS. 3 and 4, a plurality of first high frequency radiating element arrays of each beam antenna sub-array 31 are arranged on the reflection plate 10 in a common plane (e.g., a plane of the flat member 11).

Accordingly, when the multiple first high frequency radiating element arrays are arranged on the flat member 11 of the reflection plate 10 in a common plane, all of the first high frequency radiating element arrays are arranged on the bending member 12 corresponding to the side of the beam antenna sub-array 31 or 32. In other words, in the beam antenna sub-array 31 or 32, the plurality of first high frequency radiating element arrays are all arranged on the bending member 12 corresponding to a side of the low frequency antenna array 20 that the beam antenna sub-array 31 or 32 is disposed on. As shown in FIG. 4, the first high frequency radiating element arrays of the left side beam antenna sub-array (the first beam antenna sub-array 31) are arranged on the bending member 12 of the left side, while the first high frequency radiating element arrays of the right side beam antenna sub-array (the second beam antenna sub-array 32) are arranged on the bending member 12 of the right side, and the plurality of the first high frequency radiating element arrays are in the same plane. Further, a detailed description is made by taking both the first beam antenna sub-array 31 and the second beam antenna sub-array 32 including three first frequency radiating element arrays as an example. The three first high frequency radiating element arrays of the first beam antenna sub-array 31 are a first high frequency radiating element array 311, a first high frequency radiating element array 312, and a first high frequency radiating element array 313, while the three first high frequency radiating element arrays of the second beam antenna sub-array 32 are a first high frequency radiating element array 321, a first high frequency radiating element array 322, and a first high frequency radiating element array 323. It can be seen in FIG. 4 that the first high frequency radiating element array 311, the first high frequency radiating element array 312, and the first high frequency radiating element array 313 are in the same plane, i.e., on the bending member 12 of the reflection plate 10, but are in a plane different from the low frequency antenna array 20.

In conjunction with FIGS. 3 and 4, the hybrid network antenna array further includes a high frequency antenna array 40 disposed on the flat member 11 of the reflection plate 10. Two beam antenna sub-arrays 31 are located on the both sides of the low frequency antenna array 20 and the high frequency antenna array 40. The high frequency antenna array 40 includes a second high frequency radiating element array, wherein the second high frequency radiating element array is interleaved with the adjacent first high frequency radiating element array to reduce the interference. The specific structure of the second high frequency radiating element array is described in detail in the previous embodiments, and thus is not described herein.

Figure 5:
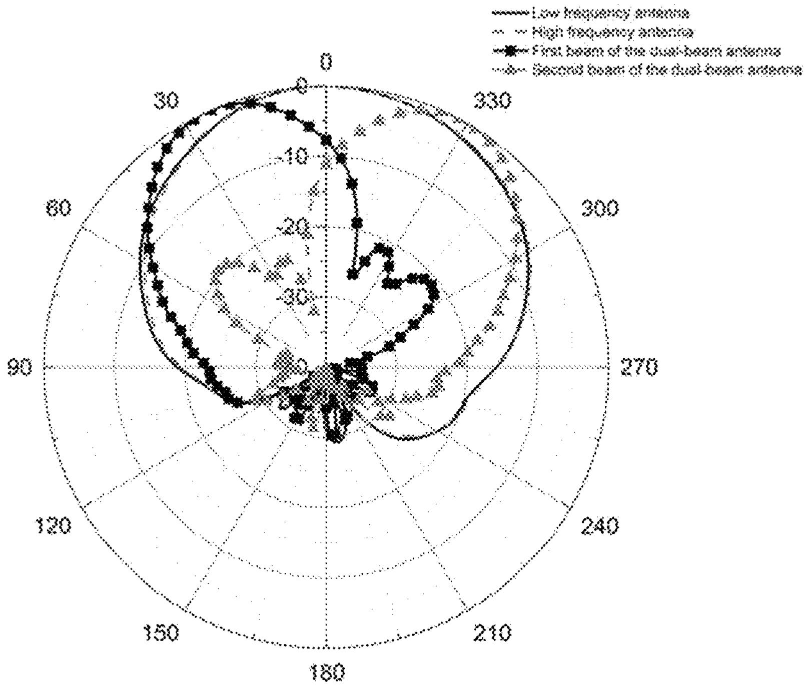
FIG. 5 is a schematic view of an antenna pattern of a hybrid network antenna according to some embodiments of the present disclosure.
Figure 6:
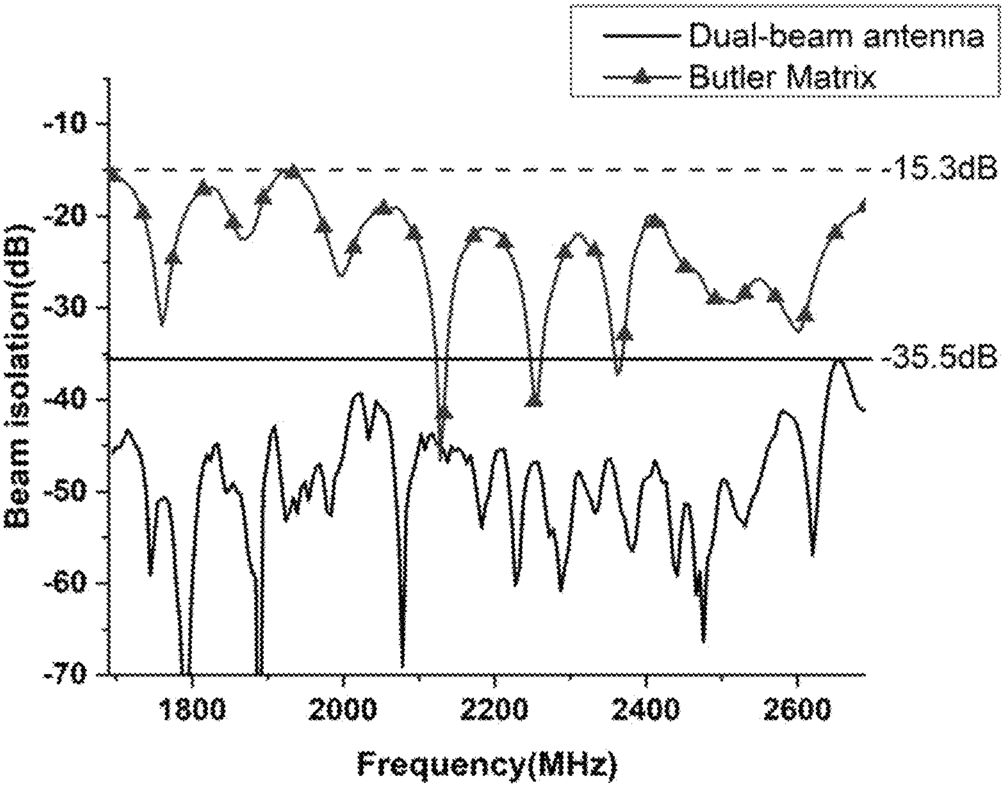
FIG. 6 is a comparing diagram of positive polarization isolation.
Figure 7:
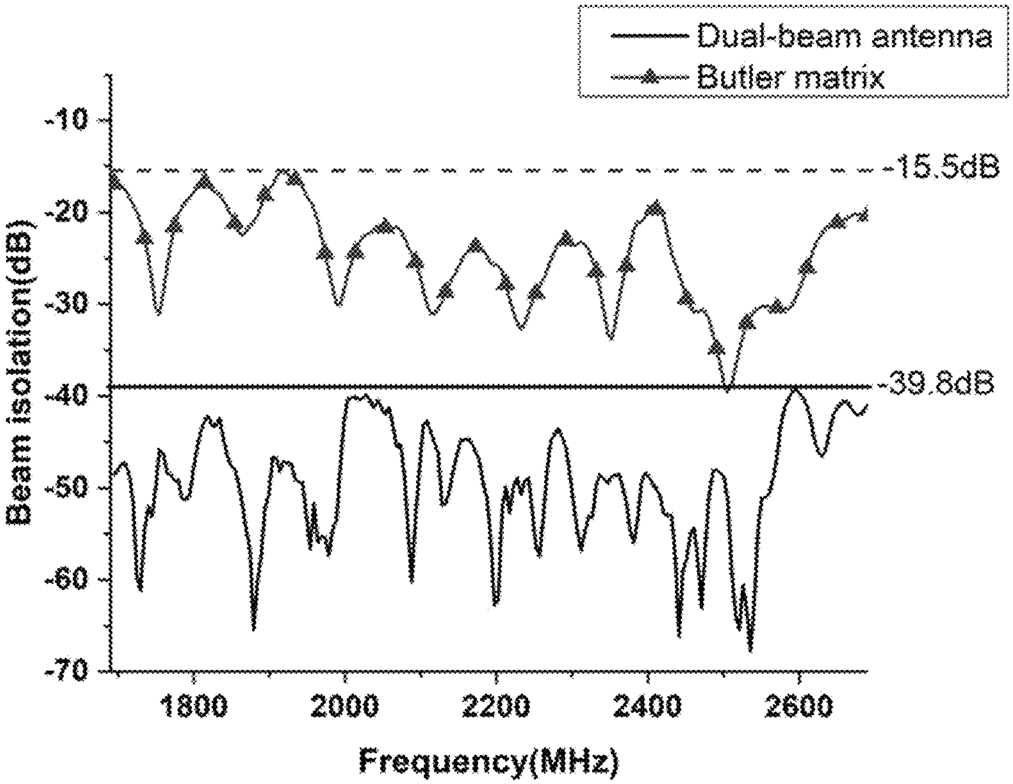
FIG. 7 is a comparing diagram of negative polarization isolation.

The hybrid network antenna according to the present disclosure provides two beam antenna sub-arrays of the dual-beam antenna arranged on two sides of the low frequency antenna array and the high frequency antenna array respectively, so that the two beam antenna sub-arrays are widely spaced apart, which can provide high beam pointing stability and high co-polarized isolation characteristics, reduce the interference between co-polarized beams. Specifically, as shown in FIG. 5, the lobe widths of the low frequency antenna array beam and the high frequency antenna array are 65°, while the lobe width of the two beams of the dual-beam antenna are narrower, and thus good beam pointing stability and strong anti-interference ability can be provided. FIG. 6 is a comparing diagram of positive polarization isolation, FIG. 7 is a comparing diagram of negative polarization isolation, as shown in FIGS. 6 and 7, the co-polarized isolation of the conventional Butler matrix multi-beam antenna is −15 dB, and in the hybrid network antenna described in the present disclosure, the co-polarized isolation of the dual-beam antenna may reach −35 dB or more, which greatly reduces the interference between the co-polar beams. And in the dual-beam antenna array 30 of both sides of the low frequency antenna array 20, a plurality of the first high frequency radiating element arrays are arranged on the reflection plate 10 in a common plane, which can provide a space sufficiently large for the high and low frequency antenna arrays to improve the stability of the antenna structure.

The hybrid network antenna according to the present disclosure flexibly nests a low frequency antenna array 20, a high frequency antenna array 40, and a dual-beam antenna array 30 on a trapezoidal reflection plate, and a plurality of antenna arrays can operate in different bands, on the one hand, to satisfy the needs of different regions and/or different customers, and on the other hand, to reduce the total number of antennas, to reduce the construction cost of the base station, and to alleviate the contradiction between the antenna sites.

Technical contents and technical features of the present disclosure have been described in detail, however, those skilled in the art may still make replacement and modification based on the teachings and disclosure of the invention without departing from the spirit of the present disclosure, and therefore, the scope of the invention should not be limited to the contents disclosed in the examples, but should include various substitutions and modifications that do not depart from the present disclosure, and are covered by the claims of this patent.

What is claimed is:

1. A hybrid network antenna, comprising:

a reflection plate comprising a flat member and bending members arranged at two ends of the flat member, each bending member being formed by bending a respective end of the two ends, and the reflection plate having a width direction and a length direction perpendicular to the width direction;

a low frequency antenna array arranged on the flat member, for operation in 698-960 MHz; and a dual-beam antenna array comprising beam antenna sub-arrays disposed on two sides of the low frequency antenna array, wherein:

the beam antenna sub-array on each side of the low frequency array comprises a plurality of first high frequency radiating element arrays disposed in intervals along the width direction of the reflection plate, for operation in 1695-2690 MHz;

in each beam antenna sub-array, at least one first high frequency radiating element array of the plurality of first high frequency radiating element arrays is arranged on the flat member and the remaining first high frequency radiating element arrays of the plurality of first high frequency radiating element arrays are arranged on the bending member corresponding to a respective side of the low frequency antenna array that the beam antenna sub-array is disposed on.

2. The hybrid network antenna according to claim 1, wherein a cross section of the reflection plate is in a trapezoid shape.

3. The hybrid network antenna according to claim 1, wherein the low frequency antenna array comprises a plurality of low frequency radiating elements disposed in intervals along the length direction of the reflection plate.

4. The hybrid network antenna according to claim 3, wherein the plurality of the low frequency radiating elements are arranged in an S-shape along the length direction of the reflection plate.

5. The hybrid network antenna according to claim 1, wherein adjacent two arrays of the first high frequency radiating element arrays are interleaved.

6. The hybrid network antenna according to claim 1, wherein each of the first high frequency radiating element arrays comprises a plurality of first high frequency radiating elements disposed in intervals along the length direction of the reflection plate, and the plurality of the first high frequency radiating elements are arranged in a linear arrangement.

7. The hybrid network antenna according to claim 1, wherein the hybrid network antenna further comprises a high frequency antenna array including a second high frequency radiating element array and arranged on the flat member, and the beam antenna sub-arrays are located on both sides of the high frequency antenna array.

8. The hybrid network antenna according to claim 7, wherein the second high frequency radiating element array is interleaved with one of the first high frequency radiating element arrays that is adjacent to the second high frequency radiating element array.

9. The hybrid network antenna according to claim 8, wherein the second high frequency radiating element array comprises a plurality of second high frequency radiating elements arranged in intervals along the length direction of the reflection plate, and the plurality of the second high frequency radiating elements are arranged in a linear arrangement.

10. A hybrid network antenna, comprising:

a reflection plate comprising a flat member and bending members arranged at two ends of the flat member, each bending member being formed by bending an end of the flat member, and the reflection plate having a width direction and a length direction perpendicular to the width direction;

a low frequency antenna array arranged on the flat member, for operation in 698-960 MHz; and a dual-beam antenna array comprising beam antenna sub-arrays disposed on two sides of the low frequency antenna array, wherein:

the beam antenna sub-array on each side of the low frequency array comprises a plurality of first high frequency radiating element arrays disposed in intervals along the width direction of the reflection plate, for operation in 1695-2690 MHz;

in each beam antenna sub-array, the plurality of first high frequency radiating element arrays are all arranged on the bending member corresponding to a respective side of the low frequency antenna array that the beam antenna sub-array is disposed on.

11. The hybrid network antenna according to claim 10, wherein a cross section of the reflection plate is in a trapezoid shape.

12. The hybrid network antenna according to claim 10, wherein the low frequency antenna array comprises a plurality of low frequency radiating elements disposed in intervals along the length direction of the reflection plate.

13. The hybrid network antenna according to claim 12, wherein the plurality of the low frequency radiating elements are arranged in an S-shape along the length direction of the reflection plate.

14. The hybrid network antenna according to claim 10, wherein adjacent two arrays of the first high frequency radiating element arrays are interleaved.

15. The hybrid network antenna according to claim 10, wherein each of the first high frequency radiating element arrays comprises a plurality of first high frequency radiating elements disposed in intervals along the length direction of the reflection plate, and the plurality of the first high frequency radiating elements are arranged in a linear arrangement.

16. The hybrid network antenna according to claim 10, wherein the hybrid network antenna further comprises a high frequency antenna array including a second high frequency radiating element array and arranged on the flat member, and the beam antenna sub-arrays are located on both sides of the high frequency antenna array.

17. The hybrid network antenna according to claim 16, wherein the second high frequency radiating element array is interleaved with one of the first high frequency radiating element arrays that is adjacent to the second high frequency radiating element array.

18. The hybrid network antenna according to claim 17, wherein the second high frequency radiating element array comprises a plurality of second high frequency radiating elements arranged in intervals along the length direction of the reflection plate, and the plurality of the second high frequency radiating elements are arranged in a linear arrangement.

* * * * *